US009468065B2

(12) United States Patent
Väänänen

(10) Patent No.: US 9,468,065 B2
(45) Date of Patent: Oct. 11, 2016

(54) COMBINED HYBRID AND LOCAL DIMMING CONTROL OF LIGHT EMITTING DIODES

(71) Applicant: Texas Instruments Incorporated, Dallas, TX (US)

(72) Inventor: Ari Kalevi Väänänen, Oulu (FI)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/882,406

(22) Filed: Oct. 13, 2015

(65) Prior Publication Data

US 2016/0113085 A1 Apr. 21, 2016

Related U.S. Application Data

(60) Provisional application No. 62/064,410, filed on Oct. 15, 2014.

(51) Int. Cl.

| | |
|---|---|
| ***H05B 33/08*** | (2006.01) |
| ***G09G 3/34*** | (2006.01) |
| ***G09G 3/36*** | (2006.01) |
| ***G02F 1/1335*** | (2006.01) |

(52) U.S. Cl.

CPC ......... *H05B 33/0845* (2013.01); *G02F 1/1336* (2013.01); *G09G 3/3426* (2013.01); *G09G 3/36* (2013.01); *G09G 2320/064* (2013.01)

(58) Field of Classification Search

None

See application file for complete search history.

(56) References Cited

U.S. PATENT DOCUMENTS

| | | | | |
|---|---|---|---|---|
| 6,618,031 | B1 | 9/2003 | Bohn, Jr. et al. | |
| 8,120,277 | B2 | 2/2012 | McKinney | |
| 8,587,212 | B2 * | 11/2013 | Li | H05B 33/0854 315/250 |
| 8,872,810 | B2 | 10/2014 | Väänänen et al. | |
| 2008/0202312 | A1 | 8/2008 | Zane et al. | |
| 2011/0175938 | A1 * | 7/2011 | Lee | G09G 3/3406 345/690 |
| 2012/0086701 | A1 | 4/2012 | Väänänen et al. | |
| 2015/0022096 | A1 * | 1/2015 | Deixler | H05B 37/0218 315/153 |

OTHER PUBLICATIONS

PCT Search Report for Application No. PCT/US 2015/055824, dated Feb. 25, 2016.

* cited by examiner

*Primary Examiner* — Dedei K Hammond

(74) *Attorney, Agent, or Firm* — Andrew Viger; Frank D. Cimino

(57) ABSTRACT

An LED backlight controller combines global/hybrid and local brightness/dimming control for an LED backlight illuminator with local regions illuminated by associated LED strings. Global/hybrid brightness/dimming control performs hybrid digital modulation control for a predefined lower range of brightness levels, with string current maintained at a substantially constant level associated with a predefined maximum brightness for the lower range (controlling brightness by adjusting digital modulation, such as PWM duty cycle, up to a maximum), and performs hybrid string current control for a predefined higher range of brightness levels (controlling brightness by adjusting string current). Local dimming control is performed by introducing a local digital modulation signal into a hybrid digital modulation control path for the associated string, so that digital modulation for the associated string is a combination of local digital modulation and global/hybrid digital modulation.

18 Claims, 3 Drawing Sheets

200
PWM CONTROL 202
CURRENT CONTROL 204
206
LED CURRENT
100%
50%
25%
LED BRIGHTNESS
25%
50%
100%

COMBINED HYBRID AND LOCAL DIMMING CONTROL OF LIGHT EMITTING DIODES

CROSS-REFERENCE TO RELATED APPLICATION

The present application claims the benefit of the filing date of U.S. Provisional Patent Application Ser. No. 62/064,410, also entitled Combined Hybrid and Local Dimming Control for Light Emitting Diodes, filed Oct. 15, 2014, which is incorporated herein in its entirety by reference.

TECHNICAL FIELD

Aspects of the invention are directed, in general, to illumination control, and more specifically to, combined hybrid and/or local dimming (illumination) control suitable for use in (backlight) illumination for an (Liquid Crystal Display (LCD)) display, or the like.

BACKGROUND

Local dimming is used in a Light Emitting Diode (LED) backlight system that is configured to separately control backlight illumination and dimming for local display regions or blocks of an LCD display. LCD display systems can be configured with full array or edge-lit backlight illumination systems, including configuration of the backlight illumination system to provide local illumination and dimming for local display blocks in a full array, or local display regions or blocks in an edge-lit array. For example, local dimming can be implemented in an LCD display with an LED backlight system configured into local display regions or blocks. The backlight LEDs are positioned so that an LED string illuminates an associated local display regions or blocks. Each LED driver string may have a driver that outputs a separate brightness setting, controlling the illumination of its associated LED string. Local dimming control is used to enable dimming control of each local display regions or blocks independent of dimming control applied to the rest of the display. Hence, for local illumination and dimming, LEDs are positioned so that an LED string illuminates a single local display region or block. Each LED (string) driver can be controlled for a separate brightness setting based on local illumination and dimming control. LED driver Integrated Circuits (ICs) may employ multiple channels and, with various dimming methods and on-chip protections. Such ICs may be somewhat application specific, adapted to provide backlighting control for a particular type of device, such as smartphones, tablet computing devices, notebook computers, computer displays, televisions, or the like.

SUMMARY OF THE INVENTION

Aspects of the invention provide combined hybrid and local dimming control of LEDs. In an LCD system, or other illuminated panel, with controlled LED dimming, a plurality of strings of backlight LEDs are arranged to provide backlight illumination to the panel, with each controlled by an LED driver, and at least some LEDs arranged to provide backlight illumination to respective local display regions or blocks of the panel.

A local LED driver control unit may be configured to generate a hybrid digital modulation control signal in a digital modulation control path associated with a digital modulation setting corresponding to a desired LED brightness value associated with a master brightness control signal, up to a specified maximum digital modulation setting, while maintaining string current and string voltage substantially constant, for a range of lower LED master brightness values.

Meanwhile, for a range of higher LED master brightness values above the LED brightness value associated with the maximum digital modulation setting, a hybrid current control signal is generated in a current control path associated with a string current corresponding to a desired LED brightness value associated with the master brightness control signal.

Local dimming and illumination control for a LED driver associated with a LED string associated with a selected local display regions or blocks of the illuminated panel is selectively controlled by generating a local digital modulation control signal in the digital modulation control path associated with a digital modulation setting corresponding to a desired LED brightness value for the selected local display regions or blocks, and combining the local digital modulation control signal with the hybrid digital modulation control signal to generate a composite local digital modulation control signal used to control the associated LED driver, the composite digital modulation control signal corresponding to the desired LED brightness value for the selected local display regions or blocks.

BRIEF DESCRIPTION OF THE DRAWINGS

Figure 1:
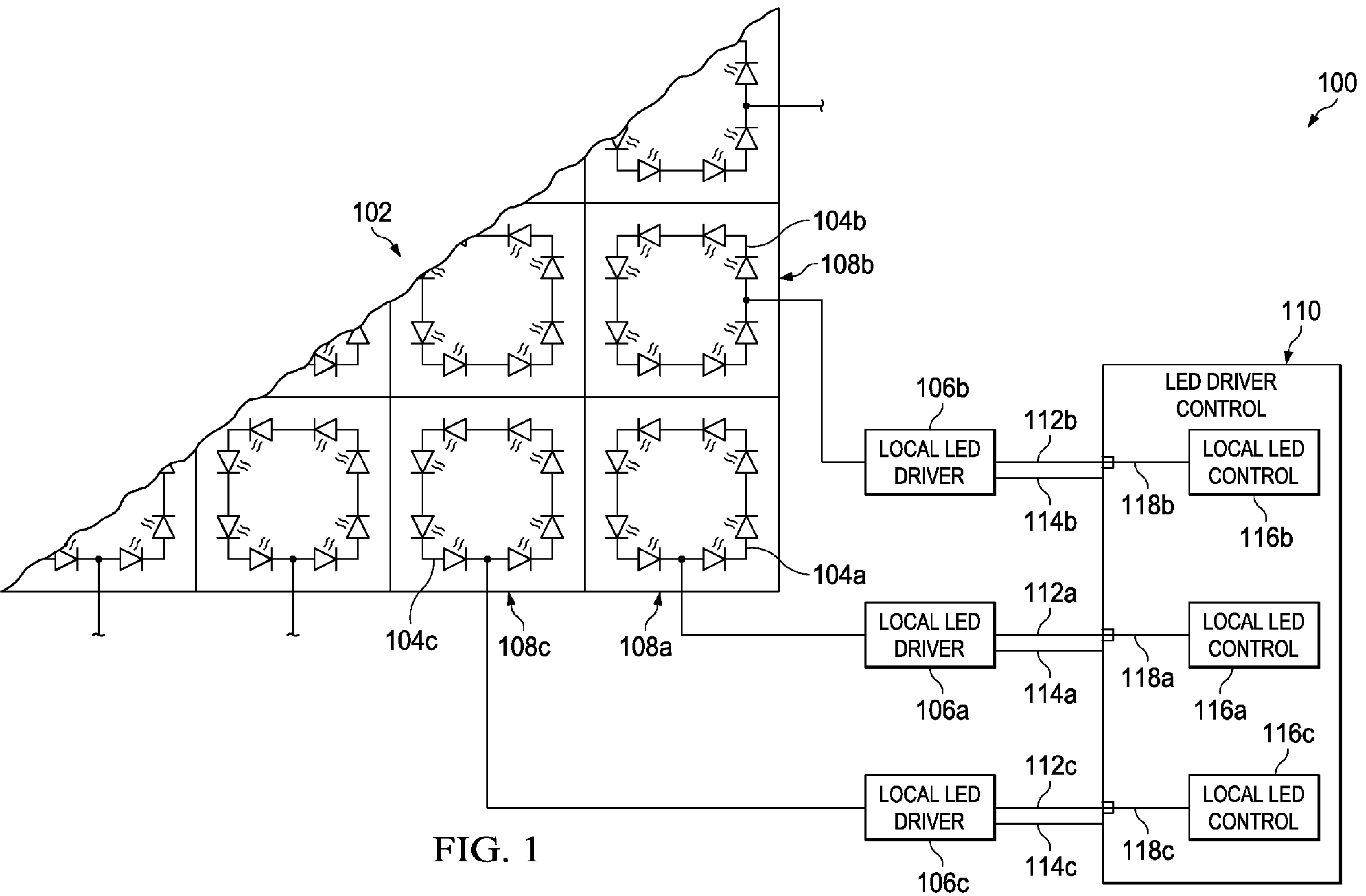
Figure 2:
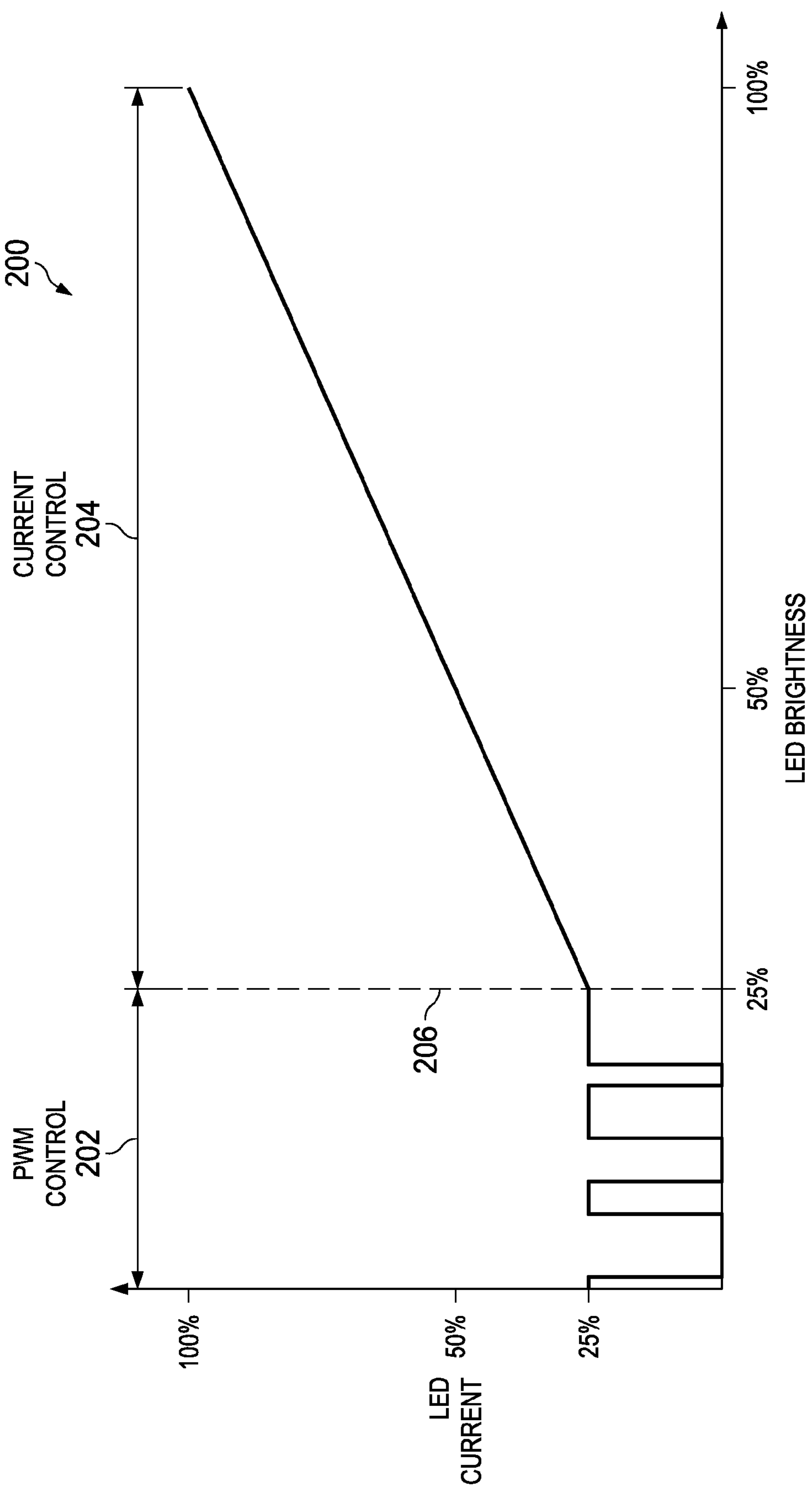
Figure 3:
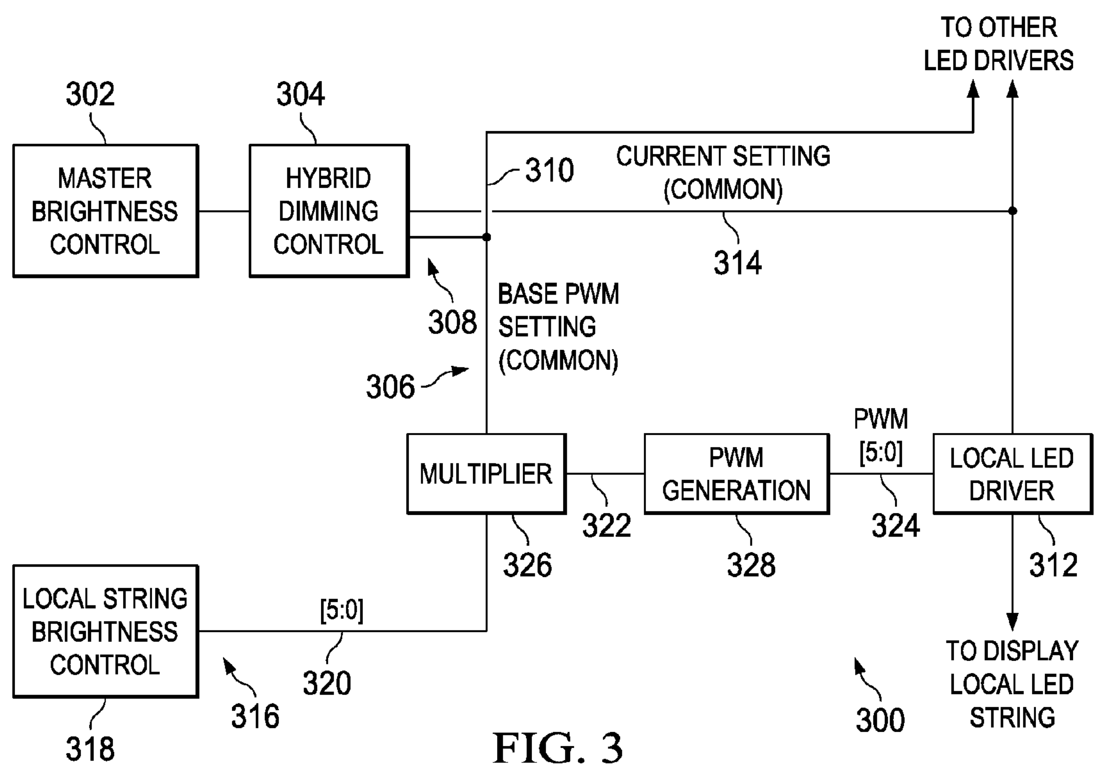
Figure 4:
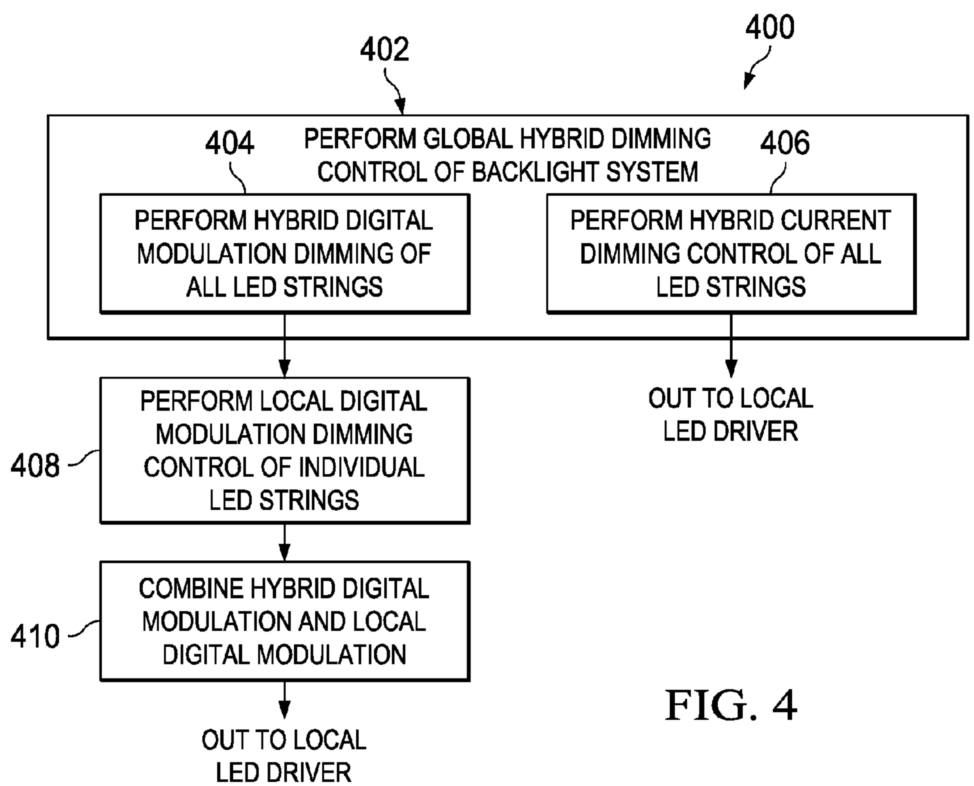

Having thus described the invention in general terms, reference will now be made to the accompanying drawings, wherein:

FIG. 1 is a diagrammatic illustration of an example environment wherein examples of the present systems and methods for combined hybrid and local dimming control of LEDs may be employed, in accordance with some embodiments;

FIG. 2 is a graph (200) of (global) hybrid LED dimming as may be employed as a part of the present systems and methods for combined hybrid and local dimming control of LEDs, in accordance with some embodiments;

FIG. 3 is a diagrammatic, block illustration of at least a portion of an example system or apparatus for employing the present combined hybrid and local dimming control of LEDs, in accordance with some embodiments; and FIG. 4 is a flowchart of an example implementation of the present systems and methods for combined hybrid and local dimming control of LED, according to some embodiments.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

Combined hybrid and local dimming control in accordance with the present systems and methods is suitable for use in backlight control for an illuminated structure, such as an illuminated panel, for example an LCD display, or the like. Hybrid dimming control comprises a hybrid, that is a combination of digital modulation, such as Pulse Width Modulation (PWM) and electrical current dimming (illumination) control, which may be implemented as hybrid PWM dimming during a predefined range of relatively lower LED brightness levels in which PWM modulation may be used to control brightness (with string current substantially constant). For a predefined range of relatively higher LED brightness levels, hybrid current control may be used to adjust LED brightness (with PWM fixed at some maximum setting, such as one-hundred percent). Such hybrid dimming control is described as "A system for Combined Digital Modulation and Current Dimming Control for Light Emitting Diodes," published as U.S. Patent Publication 2012/0086701 on Apr. 12, 2012, which issued as U.S. Pat. No. 8,872,810 on Oct. 28, 2014, which is commonly assigned, and names as an inventor the inventor hereof, and the disclosure of which is incorporated herein in its entirety by reference.

For combined hybrid and local dimming control in accordance with embodiments of the present systems and methods hybrid (PWM and/or current) dimming is applied to the full display, and local dimming for local display regions or blocks is implemented as local PWM modulation control introduced into the hybrid PWM control path (without affecting string currents or string voltages otherwise set by global (hybrid) dimming). That is, local dimming control is combined with the hybrid digital modulation output of the hybrid brightness/dimming control so that dataflow for local dimming is the same independent of global/master brightness/dimming control (i.e., independent of the hybrid brightness/dimming range). Embodiments of combined hybrid and local dimming control according to the present systems and methods can be implemented in full-array and edge-lit backlight systems, as well as in other lighting systems, such general illumination (lighting) systems, signage, etc.

Herein, description of example embodiments of combined hybrid and local dimming control according to the present systems and methods, refer generally to PWM modulation as an example form of digital modulation control for an LED driver, in contrast to current control that adjusts string electrical current. Other embodiments of hybrid and/or local dimming control according to the present systems and methods can be implemented with other forms of digital modulation.

FIG. 1 is a diagrammatic illustration of an example environment 100 wherein examples of the present systems and methods for combined hybrid and local dimming control of LEDs may be employed, in accordance with some embodiments. For example, FIG. 1 shows deployment of the present combined hybrid and local dimming control of LEDs in conjunction with illuminable assembly 102, such an illuminable assembly may be a lighting panel, (LCD) display, or the like. The present systems and methods for combined hybrid and local dimming control of LEDs combine LED hybrid dimming with local dimming, such as for backlight illumination control of LCD display system 102. Therein, a plurality of strings of backlight LEDs (104, generally) are arranged to provide backlight illumination to the LCD, each string controlled by an LED driver (106, generally), and at least some arranged to provide backlight illumination to respective local display regions or blocks (108, generally) of the LCD, for example local string 104 for local section or region 108. Thus, environment 100 shows lighted panel 102, which may be an LCD, or the like, with controlled LED dimming, which may be implemented in accordance with embodiments of the present systems and methods for combined hybrid and local dimming. The LCD display system (102) includes an LED backlight system (full-array or edge-lit) 104 configured with local display blocks or sections 108*a*, 108*b*, etc. each illuminated by an associated LED string 104*a*, 104*b*, etc. controlled by driver 106*a*, 106*b*, etc.

LED driver control unit 110 may be configured to perform hybrid digital modulation and hybrid current dimming and illumination control of LED drivers 104 of LED backlight system 104, to control LED backlight illumination of (LCD) panel 102. In accordance with embodiments of the present systems and methods, hybrid brightness/dimming control is a hybrid of digital modulation control and string current control. This may include LED driver control unit 110 providing a master brightness control signal to digital modulation and current control paths (generally, 112 and 114, respectively, by way of example) for each LED driver 106. This master brightness control signal may be generally associated with a system/user-desired (global) backlight illumination for the LCD, and based on a (user) selected master (percent) brightness setting for the (LCD) panel.

In global control of master brightness levels, or the like, LED driver control unit 110 may, for a predefined range of lower LED master brightness values, generate a hybrid digital modulation control signal in digital modulation control path 112, which is associated with a digital modulation setting and corresponds to a desired LED brightness value associated with the master brightness control signal. This digital modulation may be up to a specified maximum digital modulation setting. Regardless, in accordance with embodiments of the present systems and methods, string current and string voltage called for by LED driver control unit 110 is maintained substantially constant under such lower LED master brightness values where hybrid digital modulation control is used for master brightness control of drivers 106 and hence display 102.

Further, in global control of master brightness levels, or the like, LED driver control unit 110 may also, for a predefined range of higher LED master brightness values, such as above the LED brightness value associated with the maximum digital modulation setting, generate a hybrid current control signal in a current control path 114, which associated with a string current corresponding to a desired LED brightness value associated with the master brightness control signal.

In accordance with embodiments of the present systems and methods, LED driver control unit 110 may also selectively perform local dimming and illumination control for an LED driver (106*a*, for example) associated with an LED string (104*a*, in this example) associated with a selected local display regions or blocks (108*a*, for example) of the (LCD) panel 102. In accordance with such embodiments, a local LED driver control unit (116 generally, 116*a* in this example), which may be a part of LED driver control unit 110 and/or a functionality thereof, may generate a local digital modulation control signal into the digital modulation control path 112*a*, such as via digital modulation control path 118*a* in this example (118, generally in FIG. 1). This local digital modulation signal is associated with a digital modulation setting corresponding to a desired LED brightness value for selected local display regions or blocks 108*a*. The local digital modulation control signal is, in accordance with embodiments of the present systems and methods, additively or negatively, combined with the master brightness hybrid digital modulation control signal to generate a composite local digital modulation control signal along path 112*a* (in this example) to be used to control associated LED driver 106*a* (in this example). The composite digital modulation control signal corresponds to the (total) system/user-desired LED brightness value for selected local display regions or blocks 108*a* (in this example).). Local dimming control is thereby combined with the hybrid digital modulation output of the hybrid brightness/dimming control so that dataflow for local dimming is the same independent of global/master brightness/dimming control (i.e., independent of the hybrid brightness/dimming range).

Hybrid dimming control comprises a hybrid combination of PWM and current dimming control. During a predefined range of relatively lower LED brightness levels hybrid dimming control employs PWM modulation to control brightness (with string current substantially constant), and for a predefined range of relatively higher LED brightness levels, PWM is fixed at some maximum setting, such as one-hundred percent, and hybrid dimming current control is used to adjust LED brightness by controlling string current. As noted, such hybrid PWM and current dimming is described in incorporated U.S. Patent Publication 2012/0086701.

FIG. 2 is a graph (200) of (global) hybrid LED dimming as may be employed as a part of the present systems and methods for combined hybrid and local dimming control of LEDs, in accordance with some embodiments. Graph 200 plots the output current through the controlled LEDs when an input signal is swept from 0% to 100%. Within first range 202 of brightness values, digital modulation control is used, while the current through the LEDs remains relatively constant. Many LEDs have their highest optical efficiency, meaning they can generate the highest lumens per watt, when the current through the LEDs is around 25% of their rated value (in this case, around 6 mA). For these types of LEDs, that current may be used at lower brightness values, and the actual brightness of the LEDs may be varied using digital modulation control as shown in FIG. 2. As a result, the LEDs may be operating at or near maximum optical efficiency during this time. Within a second range 204 of brightness values, current control may be used to adjust the current through the LEDs, while the digital modulation control signal is generally above a specified duty cycle (such as 90%) as shown in FIG. 2. During this time, the optical efficiency of the LEDs drops, but the LED current can increase in order to achieve higher brightness. The LED current could increase up to a maximum value, such as around 25 mA in the illustrated example.

In FIG. 2, the separation of the ranges 202 and 204 is made at the point 206. This point where the digital modulation control signal generally reaches a 90-100% duty cycle, and additional increases in brightness are not achieved by increasing the duty cycle of the PWM control signal since current is limited to around 6 mA in range 202. Point 206 could represent any suitable brightness value and may vary depending on the LEDs being used. Point 206 could, for instance, represent a brightness value of 20% or 25%. Above point 206, an increase in current is used to achieve higher brightness, and current control is used to adjust the brightness of the LEDs. By using digital modulation control in lower brightness range 202 and current control in higher brightness range 204, significant efficiency gains can be obtained, particularly in lower range 202. This can help to reduce power consumption by the LEDs, such as by 20% or more. This is possible even though the LEDs are producing the same amount of luminance.

FIG. 3 is a diagrammatic, block illustration of example system or apparatus 300 for employing the present combined hybrid and local dimming control of LEDs, in accordance with some embodiments. For example, FIG. 3 may be viewed as a block diagram of (a portion of) an example (integrated) circuit employing an embodiment of the present systems and methods for combined hybrid and local dimming control of LEDs. That is, apparatus or system 300 may take the form of (a portion of an Integrated Circuit (IC), which may support "pure" PWM dimming and hybrid dimming, such as combined PWM and current brightness control. Such an IC may store and implement LED string calibration data for string brightness compensation. Also, in such and IC, LED string aging can be monitored via accumulator registers, or the like, which store information of cumulated brightness for each string.

A brightness control signal path is shown in FIG. 3, wherein LED string brightness may be controlled by a base brightness path, which is common to all LED strings, and an individual brightness setting for each string (i.e. region or local brightness). Typically, a base brightness setting and an individual region setting are multiplied and the end result is used to control the duty cycle of the corresponding LED string current. However, in accordance with the present systems and methods for combined hybrid and local dimming control of LEDs hybrid dimming function can be enabled for the base brightness control and in addition to this pure PWM dimming, such an IC may support hybrid dimming, which combines PWM and current modes for brightness control. Hybrid dimming can be enabled for the base brightness path. That is, when hybrid dimming is enabled, it may control all LED strings. In hybrid mode PWM dimming is used for the low range of brightness and current dimming for the high brightness levels as discussed above and shown in FIG. 2. Current dimming enables improved optical efficiency due to increased LED efficiency at lower currents. PWM control at low brightness levels ensures smooth and accurate control. An optional sloper feature may be employed by IC 300 to make transition from one brightness value to another smooth. Returning attention to FIG. 3, a diagrammatic block diagram of portion 300 of a(n) (integrated) circuit showing example paths for combined hybrid and local dimming control of LEDs in accordance with some embodiments. Master brightness control 302 may control hybrid diming control 304, and thereby master control paths 306 and 308 resulting in control of master LED backlight hybrid brightness/dimming of a display, or the like.

For example, first master control path 306 may be configured to generate a hybrid digital modulation control signal in digital modulation control paths 310 of LED drivers of the display, including local LED string driver 312, such as via hybrid dimming control 304. First master control path 306 may only generate the hybrid digital modulation control signal, such as via hybrid dimming control 304, in digital modulation control path 310 of LED drivers of the display during a predetermined range of lower LED brightness master brightness values provided by master brightness control 302. First master control path 306 may also be configured to generate hybrid digital modulation control signal, such as via hybrid dimming control 304, in digital modulation control paths 310 of LED drivers 312 of the display up to a specified maximum digital modulation setting. Further, first master control path 306 may additionally be configured to generate the hybrid digital modulation control signal in digital modulation control paths of LED drivers of the display while maintaining string current and string voltage substantially constant, both of which may be carried out by hybrid dimming control 304, or the like.

Second master control path 308 may be configured to generate a hybrid current control signal, such as via hybrid dimming control 304, in string current control paths 314 of the LED drivers of the display, including local LED string driver 312. Second master control path 308 may be configured to generate the hybrid current control signal in string current control paths of the LED drivers of the display so as to correspond to a system/user-desired LED brightness value associated with the master brightness control signal, such as from master brightness control 302. For example, hybrid dimming control 304, as part of second master control path 308, may be configured to generate the hybrid current control signal during a predetermined range of higher LED master brightness values, such as may be dictated by master brightness control 302. Further in this regard, second master control path generation of the hybrid current control signal in string current control paths may be for string brightness above a LED brightness value associated with a maximum digital modulation setting (such as provided via first master control path 306.

Thus, LED driver 312 may be operable as a current sink, which supports both high resolution hybrid PWM control and hybrid current (amplitude) control. Advantages of each technique include LED backlight power saving. Further savings for local or regional dimming control may be obtained by employing PWM control combined with this hybrid PWM and current control in accordance with embodiments of the present systems and methods.

Local dimming control path 316 may be configured to selectively perform local dimming control of LED driver 312, which is associated with a selected LED string associated with a selected local display regions or blocks of the display. Local control path 316 may be configured to generate a local digital modulation control signal, such as by local string brightness control 318, in the digital modulation control path (320, 322, 324) of LED driver 312 associated with the selected local display regions or blocks. That is, local control path 316 may be configured to generate the local digital modulation control signal into the digital modulation control path (320, 322, 324) that is associated with a digital modulation setting of LED driver 312 associated with the selected local display regions or blocks. Local control path 316, particularly local string brightness control 318, may be configured to generate a local digital modulation control signal corresponding to a desired LED brightness value for the selected local display regions or blocks into the digital modulation control path (320, 322, 324) of LED driver associated with that selected local display regions or blocks.

Local control path 316 may be further configured to combine the local digital modulation control signal from path 320 with the hybrid digital modulation control signal from path 210, such as by multiplier 326 to generate a composite local digital modulation control signal, output on path 322, for controlling digital modulation (PWM) generation, such as at PWM generator 328 for provision to local LED driver 312, such as via path 324. The composite local digital modulation control signal output from multiplier 326, via path 322, preferably corresponds to a system-desired LED brightness value for the selected local display regions or blocks such as may be imparted by local LED driver 312 in response to the PWM signal provided by PWM generation at 322, via path 324. As a result, local dimming control is combined with the hybrid digital modulation output of the hybrid brightness/dimming control such that dataflow for local dimming is the same independent of global/master brightness/dimming control (i.e., independent of the hybrid brightness/dimming range).

Thus in operation, such as depicted in method implementation 400 of FIG. 4, which is a flowchart of example implementation 400 of the present systems and methods for combined hybrid and local dimming control of LED, according to some embodiments. Therein, overall brightness of an LED backlight panel may be controlled, at least in part, by global hybrid brightness/dimming control of a plurality of strings of backlight LEDs making up a backlight system as a hybrid of digital modulation and current dimming at 402.

As part of this global diming, such as during relatively lower LED master brightness levels, hybrid digital modulation (PWM) dimming may be performed at 404. This PWM control, or the like, may control brightness up to a specified maximum digital modulation setting and may result in currents for individual LED strings (such as established at 406 below) remaining substantially constant.

Hybrid current dimming control, such as may be performed for relatively higher master LED brightness levels, may adjust LED string current at 406, with hybrid digital modulation (such as established at 404) fixed at the maximum digital modulation setting.

As noted, local dimming can be implemented in an LCD display, or the like with an LED backlight system configured into local display regions or blocks in accordance with embodiments of the present systems and methods for combined hybrid and local dimming control of LED. The backlight LEDs are positioned so that an LED string illuminates an associated local display block/region. Each LED driver output can have a separate brightness setting controlling the illumination of its associated LED string. Local dimming control is used to enable dimming control of each local display block/region independent of dimming control applied to the rest of the display. In example embodiments of combined hybrid and local dimming (brightness) control according to aspects of the present systems and methods, "global" hybrid (e.g. PWM and current) illumination and dimming control, such as may be based on master brightness control, is applied to the full display, based on this master brightness control, As described above with respect to steps 402 through 406, and is combined with local illumination and dimming control for local display blocks or regions, as described below. Local illumination and dimming is implemented by introducing local dimming PWM modulation into the PWM control path.

Local dimming control of each string of LEDs may be performed by producing a local (PWM) digital modulation signal at 408 and introducing the local (PWM) digital modulation signal into a hybrid digital modulation control path for each string at 410, correspondingly changing digital modulation for the string to be a combination of hybrid digital modulation and local digital modulation. In accordance with embodiments of the present systems and methods, introducing this local PWM signal, or the like at 410 into the hybrid digital modulation from 404 for each string, without affecting string voltage or string current, such as set at 406.

Thusly, local PWM control is combined with the hybrid base PWM control settings (i.e. common settings), into a composite PWM used to control the associated LED driver. This combined hybrid and local dimming and brightness control, including composite hybrid and local PWM control, can be implemented without affecting string currents or string voltages otherwise set by the global hybrid dimming control (at 406). That is, for a local display block or section, local dimming control is based only on PWM modulation (from 404 and 408, combined). String current is substantially constant for all LED strings, as determined by the global hybrid PWM and current dimming control, based on a master brightness setting. Thereby, local dimming control may be combined with the hybrid digital modulation output of the hybrid brightness/dimming control such that dataflow for local dimming may be the same independent of global/master brightness/dimming control (i.e., independent of the hybrid brightness/dimming range).

Advantages of combined hybrid and local dimming control according to aspects of the present systems and methods include the LED string voltages remaining substantially constant during local dimming, which only occurs during hybrid PWM dimming control, so that LED driver headrooms remain substantially constant. The present systems and methods also avoid other alternatives, such as separate power supplies for each of the strings, or different headrooms for the LED current sinks Power efficiency is optimized, since, during local dimming, LED driver headrooms remain substantially constant, whereas modulating the current for each string would result in different headroom voltages, since the LED voltage is a function of current. LED string fault detection can work as normally implemented in LED driver ICs, because string voltages are the same. Further, a DC-to-DC converter, such as a Boost converter, providing supply voltage for the LED(s) (strings) may operate at a substantially constant voltage, even with local dimming that varies from frame to frame, because with hybrid PWM modulation, string voltage is substantially constant (i.e. LEDs have substantially constant voltage even when optical output changes).

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A method comprising:

performing global hybrid dimming control of a plurality of strings of backlight light emitting diodes making up a backlight system as a hybrid of digital modulation dimming and current dimming, comprising:

performing hybrid digital modulation dimming to control brightness up to a specified maximum digital modulation setting; and performing hybrid current dimming control, with hybrid digital modulation fixed at the maximum digital modulation setting, to adjust a string current for each of the strings of backlight light emitting diodes; and performing local dimming control of one or more of the strings of backlight light emitting diodes by introducing a local digital modulation signal into a hybrid digital modulation control path for each of the one or more strings of backlight light emitting diodes, correspondingly changing digital modulation for the string to be a combination of hybrid digital modulation and local digital modulation.

2. The method of claim 1, wherein performing hybrid digital modulation dimming to control brightness up to the specified maximum digital modulation setting further comprises maintaining string currents substantially constant.

3. The method of claim 1, wherein performing hybrid digital modulation dimming to control brightness is carried out during a predefined range of relatively lower light emitting diode master brightness levels.

4. The method of claim 1, wherein performing hybrid current dimming control is carried out to adjust light emitting diode string current for a predefined range of relatively higher master light emitting diode brightness levels.

5. The method of claim 1, wherein introducing the local digital modulation signal into the hybrid digital modulation control path for each string is carried out without affecting string current or string voltage.

6. The method of claim 1, wherein the digital modulation is pulse width modulation.

7. An apparatus comprising:

master control paths to control master light emitting diode backlight illumination of a display, comprising:

a first master control path configured to generate a hybrid digital modulation control signal in digital modulation control paths of light emitting diode drivers of the display;

a second master control path configured to generate a hybrid current control signal in string current control paths of the light emitting diode drivers of the display; and a local control path to selectively perform local dimming control of a light emitting diode driver associated with a selected light emitting diode string associated with a selected local display region of the display, the local control path to generate a local digital modulation control signal in the digital modulation control path of the light emitting diode driver associated with the selected local display region and to combine the local digital modulation control signal with the hybrid digital modulation control signal to generate a composite local digital modulation control signal, controlling the light emitting diode driver associated with the selected local display region.

8. The apparatus of claim 7, wherein the first master control path is operable to generate the hybrid digital modulation control signal in digital modulation control paths of light emitting diode drivers of the display during a predetermined range of lower light emitting diode brightness master brightness values.

9. The apparatus of claim 7, wherein the first master control path is operable to generate hybrid digital modulation control signal in digital modulation control paths of light emitting diode drivers of the display up to a specified maximum digital modulation setting.

10. The apparatus of claim 7, wherein the first master control path is operable to generate the hybrid digital modulation control signal in digital modulation control paths of light emitting diode drivers of the display while maintaining string current and string voltage substantially constant.

11. The apparatus of claim 7, wherein the second master control path is operable to generate the hybrid current control signal in string current control paths of the light emitting diode drivers of the display during a predetermined range of higher light emitting diode master brightness values.

12. The apparatus of claim 7, wherein the second master control path is operable to generate the hybrid current control signal in string current control paths of the light emitting diode drivers of the display above the light emitting diode brightness value associated with the maximum digital modulation setting.

13. The apparatus of claim 7, wherein the second master control path is operable to generate the hybrid current control signal in string current control paths of the light emitting diode drivers of the display to correspond to a desired light emitting diode brightness value associated with the master brightness control signal.

14. The apparatus of claim 7, wherein the local control path is further operable to generate the local digital modulation control signal in the digital modulation control path that is associated with a digital modulation setting of the light emitting diode driver associated with the selected local display region.

15. The apparatus of claim 7, wherein the local control path is further operable to generate the local digital modulation control signal in the digital modulation control path of the light emitting diode driver associated with the selected local display region corresponds to a desired light emitting diode brightness value for the selected local display region.

16. The apparatus of claim 7, wherein the composite local digital modulation control signal corresponds to a desired light emitting diode brightness value for the selected local display region.

17. The apparatus of claim 7, wherein the digital modulation is pulse width modulation.

18. A liquid crystal display system with controlled light emitting diode dimming, comprising:

a plurality of strings of backlight light emitting diodes arranged to provide backlight illumination to the liquid crystal display, each controlled by an light emitting diode driver, and at least some arranged to provide backlight illumination to respective local display regions of the liquid crystal display;

a local light emitting diode driver control unit to:

generate, for a predefined range of range of lower light emitting diode master brightness values, a hybrid digital modulation control signal in a digital modulation control path associated with a digital modulation setting corresponding to a desired light emitting diode brightness value associated with a master brightness control signal, up to a specified maximum digital modulation setting, while maintaining string current and string voltage substantially constant;

generate, for a predefined range of higher light emitting diode master brightness values above the light emitting diode brightness value associated with the maximum digital modulation setting, a hybrid current control signal in a current control path associated with a string current corresponding to a desired light emitting diode brightness value associated with the master brightness control signal; and selectively perform local dimming and illumination control for a light emitting diode driver associated with a light emitting diode string associated with a selected local display region of the liquid crystal display by generating a local digital modulation control signal in the digital modulation control path associated with a digital modulation setting corresponding to a desired light emitting diode brightness value for the selected local display region, and combining the local digital modulation control signal with the hybrid digital modulation control signal to generate a composite local digital modulation control signal used to control the associated light emitting diode driver, the composite digital modulation control signal corresponding to the desired light emitting diode brightness value for the selected local display region.

* * * * *